US 12,535,036 B2

(12) United States Patent
Ho et al.

(10) Patent No.: US 12,535,036 B2
(45) Date of Patent: Jan. 27, 2026

(54) ENGINE-INTEGRATED HEAT EXCHANGER

(71) Applicant: RTX Corporation, Farmington, CT (US)

(72) Inventors: Sherman Shoak Man Ho, Manchester, CT (US); Andrew James Iezzi, Haddam, CT (US); Stephen H. Mattia, East Haddam, CT (US); Barbara Mary Krupczak, West Springfield, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/766,099

(22) Filed: Jul. 8, 2024

(65) Prior Publication Data

US 2026/0009359 A1    Jan. 8, 2026

(51) Int. Cl.
*F02C 7/18* (2006.01)
*F02C 7/28* (2006.01)
*B64D 33/02* (2006.01)
*B64D 33/08* (2006.01)
*F02C 7/047* (2006.01)
*F02C 7/12* (2006.01)
*F02C 7/14* (2006.01)

(52) U.S. Cl.
CPC ............... *F02C 7/18* (2013.01); *F02C 7/28* (2013.01); *B64D 33/02* (2013.01); *B64D 33/08* (2013.01); *F02C 7/047* (2013.01); *F02C 7/12* (2013.01); *F02C 7/14* (2013.01); *F05D 2260/213* (2013.01)

(58) Field of Classification Search
None
See application file for complete search history.

(56) References Cited

U.S. PATENT DOCUMENTS

| | | | |
|---|---|---|---|
| 10,443,499 | B2 | 10/2019 | Snyder |
| 10,480,407 | B2 | 11/2019 | Alecu |
| 11,035,295 | B2 | 6/2021 | McGee et al. |
| 2005/0150204 | A1 | 7/2005 | Stretton et al. |
| 2016/0017751 | A1 | 1/2016 | Aircelle |
| 2021/0222620 | A1* | 7/2021 | Modrzejewski ........ F02C 7/042 |
| 2022/0154644 | A1* | 5/2022 | Johnson ................... F02C 7/18 |

OTHER PUBLICATIONS

European Search Report dated Nov. 27, 2025 for European Patent Application No. 25187929.2.

* cited by examiner

*Primary Examiner* — Lorne E Meade
*Assistant Examiner* — Alyson Joan Harrington
(74) *Attorney, Agent, or Firm* — Bachman & LaPointe, P.C.

(57) ABSTRACT

A craft has: a body including an engine bay; and an engine having an installed condition at least partially in the engine bay. The engine has a heat exchanger having an inlet manifold; and in the installed condition an air flowpath passes through the inlet manifold to the heat exchanger and exits the heat exchanger to the engine bay.

19 Claims, 5 Drawing Sheets

ENGINE-INTEGRATED HEAT EXCHANGER

BACKGROUND

The disclosure relates to gas turbine engines. More particularly, the disclosure relates to engine-integrated heat exchangers.

Gas turbine engines (used in propulsion and power applications and broadly inclusive of turbojets, turboprops, turbofans, turboshafts, industrial gas turbines, and the like) may be associated with heat air-cooled exchangers for cooling various fluids. Example fluids to be cooled include fuel, lubricating oil, and heat transfer fluids for ultimately cooling other fluids or components (e.g., including cooling of electronics). Thus, the fluid flowpath may be an open flow path (such as in the case of fuel flow from a tank to the combustor) or closed/recirculating (such as in lubrication or a heat transfer fluid).

One example of such situations involves an engine mounted in an engine bay of an aircraft fuselage.

U.S. Pat. No. 11,035,295B2 discloses a heat exchanger mounted between an engine and the structure of such a fuselage engine bay or nacelle.

SUMMARY

One aspect of the disclosure involves a craft comprising: a body including an engine bay; and an engine having an installed condition at least partially in the engine bay. The engine comprises a heat exchanger having an inlet manifold; and in the installed condition an air flowpath passes through the inlet manifold to the heat exchanger and exits the heat exchanger to the engine bay.

In a further embodiment of any of the foregoing embodiments, additionally and/or alternatively, in the installed condition, an engine bay seal seals with the inlet manifold.

In a further embodiment of any of the foregoing embodiments, additionally and/or alternatively, in the installed condition, the air flowpath passes through the engine bay seal.

In a further embodiment of any of the foregoing embodiments, additionally and/or alternatively, the air flowpath passes through apertures in the engine bay seal and portion of the manifold contacting the engine bay seal.

In a further embodiment of any of the foregoing embodiments, additionally and/or alternatively: the engine bay seal has first and second sections radially diverging from each other in an aft direction; and the manifold has a forwardly convex portion contacting the first and second sections in the installed condition.

In a further embodiment of any of the foregoing embodiments, additionally and/or alternatively, the air flowpath passes through a circumferentially distributed plurality of said apertures in the engine bay seal first section and a circumferentially distributed plurality of said apertures in the manifold.

In a further embodiment of any of the foregoing embodiments, additionally and/or alternatively, the heat exchanger is a liquid to air heat exchanger.

In a further embodiment of any of the foregoing embodiments, additionally and/or alternatively, the heat exchanger is along a recirculating liquid flowpath.

In a further embodiment of any of the foregoing embodiments, additionally and/or alternatively, the heat exchanger is along a fuel flowpath.

In a further embodiment of any of the foregoing embodiments, additionally and/or alternatively, the manifold has an outer wall section having means for providing compliance.

In a further embodiment of any of the foregoing embodiments, additionally and/or alternatively, the means for providing compliance comprises a radial jog in axial cross-sectional shape.

In a further embodiment of any of the foregoing embodiments, additionally and/or alternatively, method for assembling the craft comprises: inserting the engine to the engine bay with the heat exchanger pre-installed on the engine.

In a further embodiment of any of the foregoing embodiments, additionally and/or alternatively, the inserting causes the manifold to contact an engine bay seal.

In a further embodiment of any of the foregoing embodiments, additionally and/or alternatively, the craft is an aircraft.

In a further embodiment of any of the foregoing embodiments, additionally and/or alternatively, a method for using the craft comprises: passing an inlet airflow to the engine; passing a portion of the inlet airflow through one or more compressor sections to a combustor; and passing another portion of the inlet airflow along the inlet flowpath to the inlet manifold and through the heat exchanger to exit the heat exchanger into the engine bay.

A further embodiment of any of the foregoing embodiments may additionally and/or alternatively include extracting the engine from the craft while leaving the heat exchanger and manifold on the engine.

A further aspect of the disclosure involves a gas turbine engine comprising: a case; one or more compressor sections; a combustor section; one or more turbine sections; and a heat exchanger for air cooling a fluid. The case defines an inlet manifold for the heat exchanger.

In a further embodiment of any of the foregoing embodiments, additionally and/or alternatively, the inlet manifold has inlets positioned to draw flow from upstream of the one or more compressor sections.

In a further embodiment of any of the foregoing embodiments, additionally and/or alternatively, the inlets are a circumferentially distributed plurality.

In a further embodiment of any of the foregoing embodiments, additionally and/or alternatively, the case along the inlet manifold has an inner wall section having the inlets.

In a further embodiment of any of the foregoing embodiments, additionally and/or alternatively, the case along inlet manifold has an outer wall section having means for providing compliance.

A further aspect of the disclosure involves a method for installing an engine to a craft, the craft comprising an engine bay and the engine comprising: a flowpath through at least one compressor section, a combustor section, and at least one turbine section; a heat exchanger; and an inlet manifold for the heat exchanger. The method comprises: inserting a forward portion of the engine into a forward portion of the engine bay; said inserting engaging the engine with an engine bay seal; and closing the engine bay to leave an air flowpath through the heat exchanger exiting the heat exchanger to an outer portion of the engine bay.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
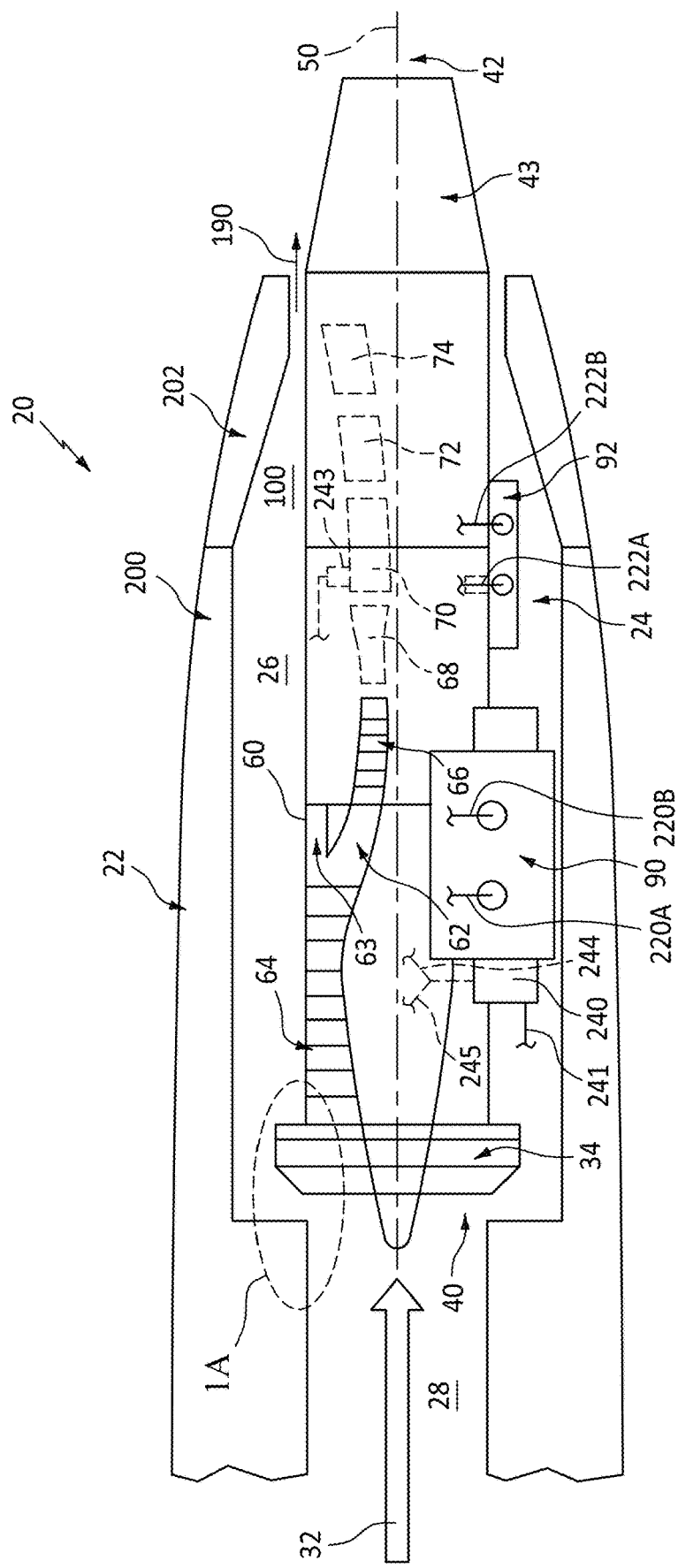
FIG. 1 is a partial schematic cutaway view of an engine bay region of an aircraft airframe.

FIG. 1 shows a craft such as an aircraft 20 having a body/fuselage/airframe 22 containing an engine 24 at least partially in an engine bay 26 for producing thrust to propel the aircraft. The example is a crewed aircraft, but alternatives include uncrewed aircraft, watercraft, and the like. The fuselage defines an upstream air inlet of an inlet duct 28 leading from an air inlet (not shown) to the engine bay so that an inlet air flowpath passes an inlet air flow 32 to an inlet 40 of the engine. The example inlet may be at a strut stage 34.

The example engine extends aft to an outlet 42 (e.g., at an exhaust nozzle 43) and has a central longitudinal axis or centerline 50 generally forming the axis of rotation of the engine's rotors.

The engine has a case structure 60 enclosing a gaspath 62 through the engine passing sequentially through an example fan section 64 having one or more fan blade stages, compressor section(s) 66, 68 each having one or more compressor blade stages, a combustor section 70, and turbine section(s) 72, 74 each having one or more stages of turbine blades. The example engine also includes a bypass flowpath branching from the gaspath 62 between fan and compressor sections. The various blade stages of each relevant section may be interspersed with vane stages. The example engine is a two-spool engine having a low speed/pressure spool including the blades of the fan section 64, compressor section 66, and turbine section 74. A high speed/pressure spool includes the blades of the high pressure compressor section 68 and the high pressure turbine section 72. The example combustor sections may include an array of can-type combustors or a single annular combustor.

FIG. 1 also schematically shows, for purposes of illustration, engine-integrated components such as a gearbox 90 and an electronics module 92. Two examples of the module 92 are an igniter box for the combustor 70 and a digital computer for engine control.

Figure 1A:
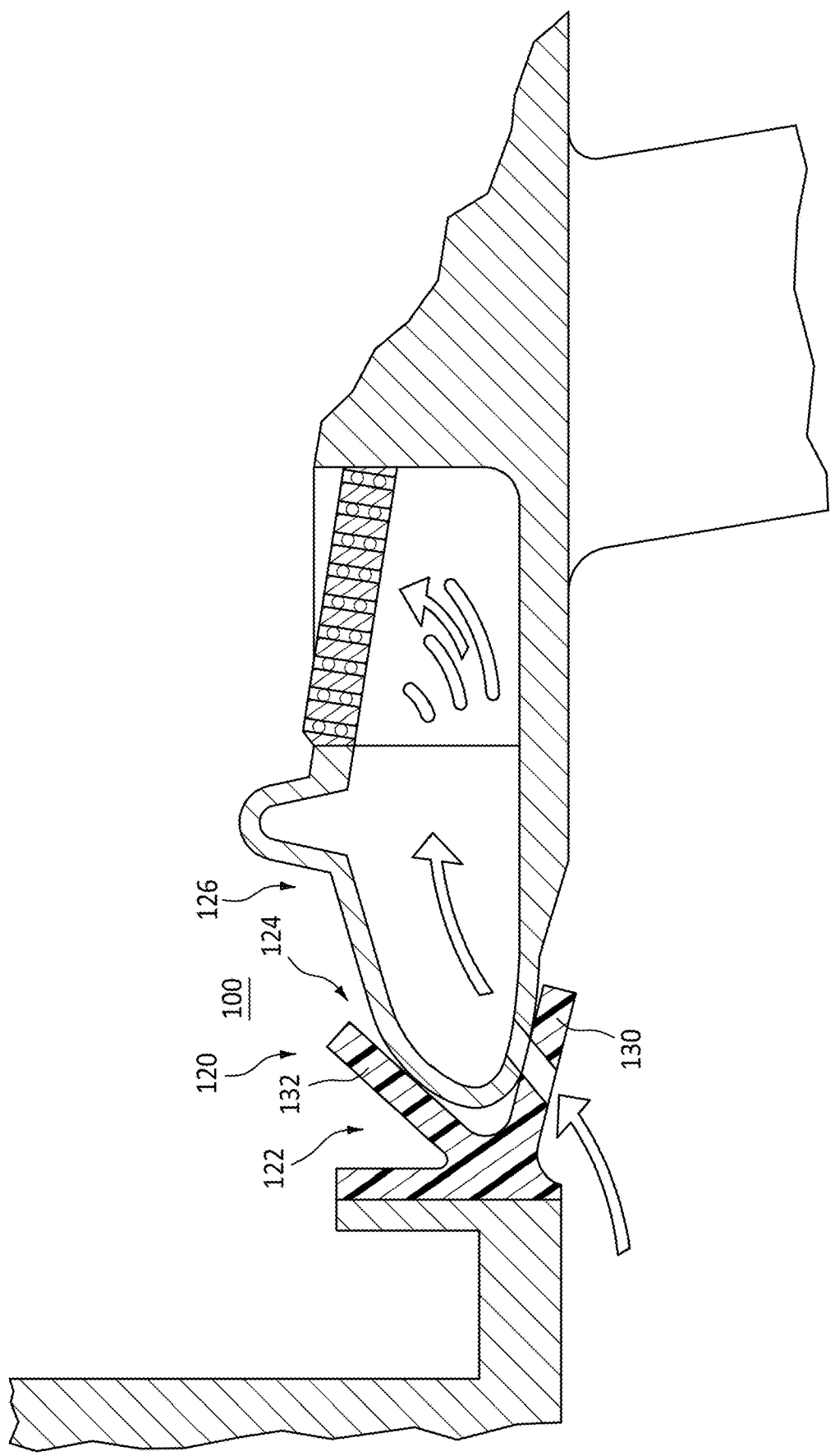
FIG. 1A is an enlarged view of a forward portion of the engine bay.

To isolate/seal an outer section/portion/region 100 (FIG. 1A) of the engine bay surrounding the engine from the inlet flow, the engine bay and engine comprise a sealing system 120 having cooperating seal portions: an airframe-side (engine bay) seal 122, and an engine seal 124. The example airframe-side seal 122 is annular (e.g., full annulus) having rearwardly radially diverging inboard 130 (FIG. 1B) and outboard 132 sections corresponding to the leg and the arm of the letter K in cross-section with the stem or upright 134 of the K mounted to a surface of an annular forward wall structure 140 of the engine bay. In a sealed condition, the cooperating engine seal 124 is radially received between the engine bay seal inboard 130 and outboard 132 sections and contacting one or both (i.e., outer diameter side/face of the inboard section 130 and inner diameter side/face of the outboard section 132). Example material for the airframe-side seal 122 is elastomer and/or metal (e.g., an elastomer-coated metal wherein the metal is thin enough to have some gross compliance with the elastomer providing sealing). Example material for the engine seal 124 is metal. But, again, this may be configured (discussed below) to have some relevant sealing compliance.

Figure 1B:
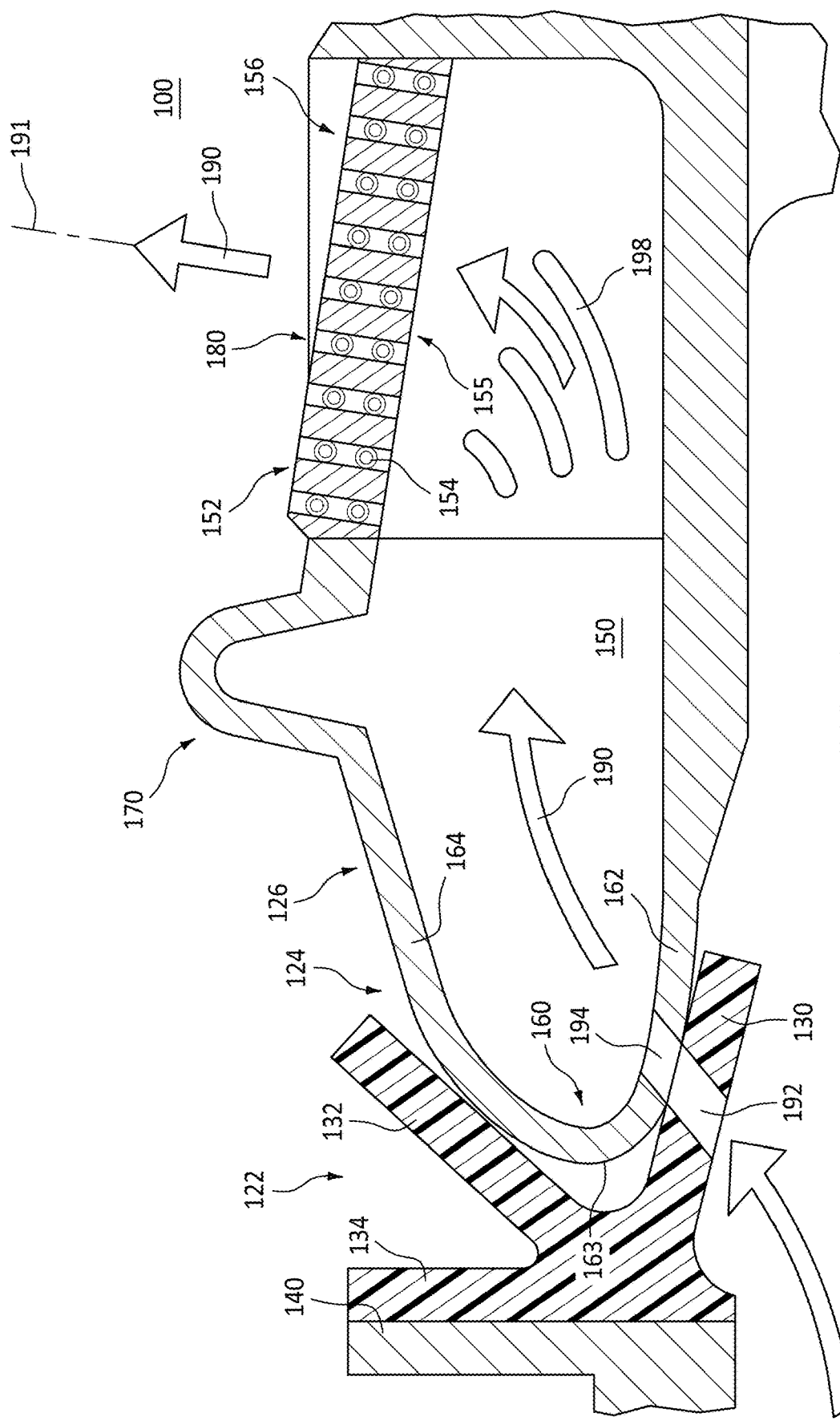
FIG. 1B is a further enlarged view of a forward portion of the engine bay.

The engine seal 124 (FIGS. 1A and 1B) may be integral with the engine case and may at least partially form a manifold 126 that bounds an inlet plenum 150 for an engine-mounted heat exchanger 152. It may also include inlet ports for such manifold 126 and plenum 150. The example engine seal is annular (e.g., full annulus). FIG. 1B shows the engine seal 124 as having a rearwardly open forward channel section 160 received between the airframe-side seal 122 inboard and outboard portions. The channel section 160 has an inboard portion 162 extending forward and outward from a main portion of the engine case. The channel section then turns back at a forward rim 163 to form an outboard portion 164 or outer wall and define an axially outward (forward) convexity traversing the rim for engaging the engine seal. In cross-section, the outboard portion 164 of the engine seal leads to an outward jog 170 (an outward radial jog in axial cross-sectional shape). The jog 170 can axially compress and extend allowing hinging flex of the inboard portion 162 providing axial and radial compliance allowing deflection of the forward portion of the engine seal 124. This axial and radial compliance, when present, may supplement compliance from the airframe-side seal 122. Aft of the jog may be a heat exchanger housing 180.

At an example aft end of the plenum 150 is the heat exchanger 152 in the housing 180. The example heat exchanger is an air-liquid heat exchanger wherein the liquid which may be the aforementioned fuel, oil, or heat transfer liquid, is passed through one or more tube 154 arrays or plate arrays (not shown). The heat exchanger and its tube or plate array has an air-side inlet 155 and outlet 156. The air is an air flow 190 diverted/branched from the inlet air flow 32 and passing along a flow path 191 through aligned apertures 192, 194 in the engine bay seal inboard portion 130 and engine seal inboard portion 162. In the illustrated example, the heat exchanger is oriented such that air flow through it has a significant outward radial component into the engine bay section 100. This redirection of air flow from plenum to heat exchanger may be aided by directional fins or turning vanes that are circumferentially (198 FIG. 1B) or radially (298 FIG. 2) oriented. While the illustrated example shows fins for a radial component for a relatively axisymmetric configuration, more complicated flow direction can be achieved if required for a given non-axisymmetric heat exchanger orientation. After exiting the heat exchanger, the air flow 190 may pass aft through the section 100 and exit the airframe as leakage (FIG. 1) or as an intentionally directed flow such as for exhaust nozzle cooling.

A number of types, configurations, positionings, and mountings of the heat exchanger 152 are possible. As noted above, this may include tube-fin heat exchangers with various arrangements of tubes or plates to carry the fluid that exchanges heat with the air (typically rejects heat to the air). For such fluid, there may be inlet and outlet manifolds and associated plenums (not shown). There may be multiple isolated fluid circuits and associated manifolds/plenums to allow multiple separate cooling operations. Or there may similarly be separate heat exchangers (e.g., circumferentially distributed) for such respective circuits.

In use, the heat exchanger 152 is preinstalled to the engine before engine-airframe integration. This includes the relevant fluid connections. In the illustrated FIG. 1 example, with a rear airframe structure 202 around the engine bay removed from forward airframe structure 200 surrounding a forward portion of the engine bay, the engine may be slid in front-first (axially inserted) with the engine seal 124 eventually abutting/sealing with the engine bay seal 122. With the engine installed, the rear structure 202 may be mounted or re-mounted to the rest of the airframe.

As example fluid connections, FIG. 1 shows the gearbox 90 as including an oil outlet line 220A and an oil return line 220B. It similarly shows the electronics module/box 92 having a coolant (e.g., glycol) outlet line 222A and return line 222B. The outlet lines extend to the heat exchanger to mate with respective ports on respective liquid inlet manifolds (not shown—a heat donor leg inlet manifold) thereof. Similarly, the return lines may extend from respective ports on respective liquid outlet manifolds.

Other closed loop examples include other lubrication systems such as bearing lubrication.

An example of an open loop flow involves cooling fuel. For example, the gearbox 90 may drive one or more pumps 240 for receiving fuel from one or more fuel tanks (not shown) via a fuel line 241. The pumps may ultimately drive fuel to a fuel manifold 243 of the combustor 70 to be discharged from fuel nozzles (not shown). A portion of the fuel may be diverted (via fuel line branch 245) from the direct path (branch 244) to the fuel manifold and passed through the heat exchanger before merging back with the main fuel flow to the fuel manifold. However, between the heat exchanger and the manifold, this cooled fuel may be used such as to cool components including the electronics module/box 92 via the lines 222B, 222A instead of using a dedicated recirculating coolant.

Figure 2:
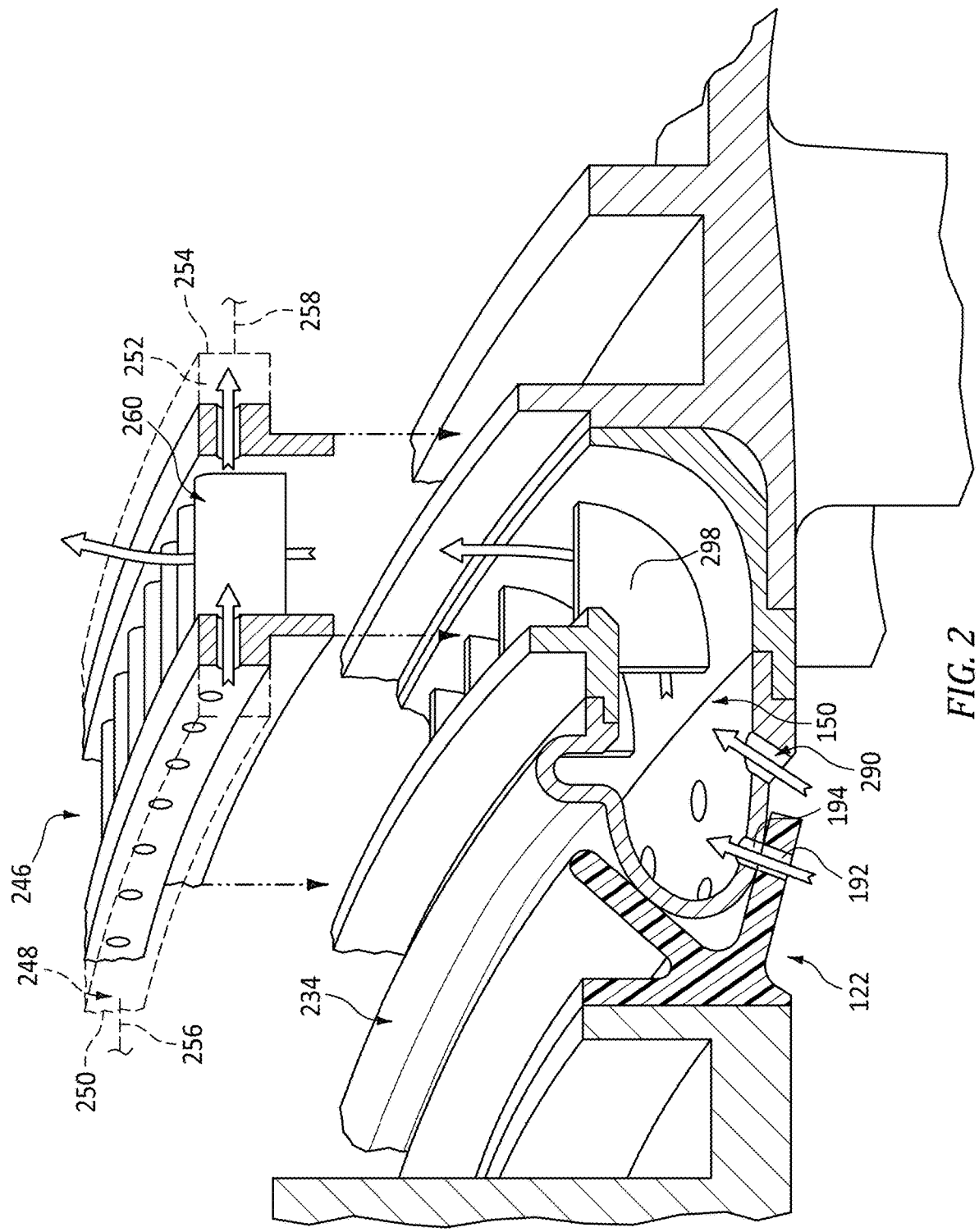
FIG. 2 is a partially exploded cutaway view of an alternate engine bay forward portion.

FIG. 2 shows a heat exchanger 246 where the liquid flows pass between a liquid inlet plenum 248 bounded by a liquid inlet manifold/header 250 and a liquid outlet plenum 252 bounded by a liquid outlet manifold/header 254. Liquid inlet line 256 and liquid outlet line 258 are also shown. Individual liquid flow legs pass through the interiors of vanes 260 to transfer heat through the vane wall structure to the air flow. In addition to the ports/apertures 192/194, ports/apertures 290 exclusively in the air inlet manifold are also shown. These two forms of manifold/plenum inlet may be alternatively or simultaneously implemented. FIG. 2 also shows a jog 234 similar to the jog 170.

Figure 3:
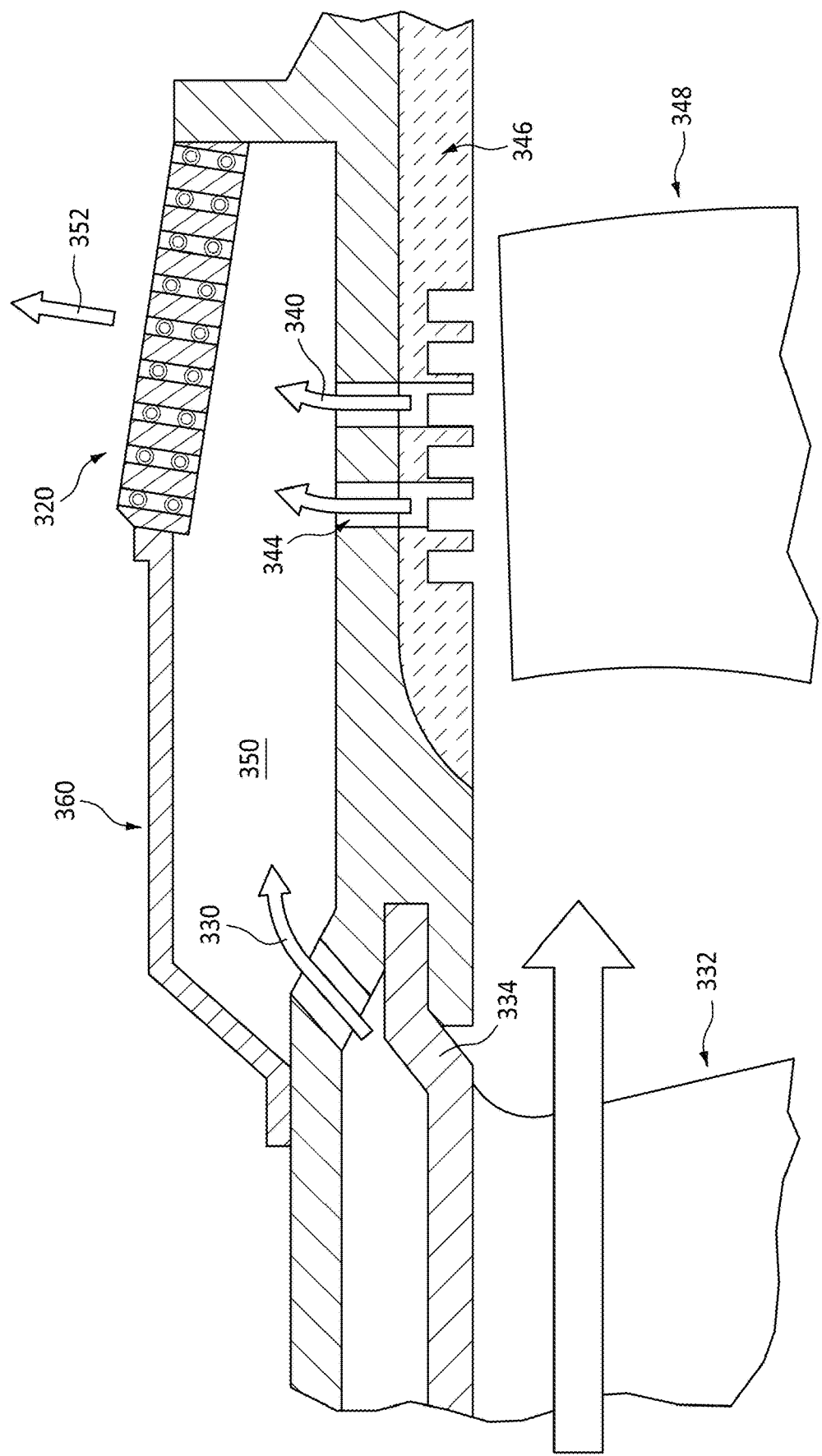
FIG. 3 is a partial schematic sectional view of an intermediate portion of the engine.

FIG. 3 shows an alternative heat exchanger 320 which may be more remotely positioned relative to the sealing system 120. This may be further aft on the engine and may have liquid connections as described for the foregoing embodiments. A first potential air source (not shown) is an inlet airflow that has bypassed compression, similar to the flow 190. Alternative flows are a fan or compressor leakage or bleed flows. FIG. 3 shows two options although only one would typically be used in a given engine. A first option is a leakage flow 330 such as around a stator 332 OD mount/shroud 334. A second option is a bleed flow 340 through ports 344 in or adjacent to a blade outer air seal 346 for a compressor or fan blade stage 348. The air inlet plenum is shown as 350 and air outlet flow is shown as 352. The inlet manifold 360 surrounding the plenum does not directly contact the engine bay seal 122 and may be formed by a jacket encircling a main case section and secured thereto or otherwise integrated therewith.

Further variations (not shown) may have the heat exchanger as other than liquid-air. For example, it may be used as the condenser or gas cooler of a vapor compression system (e.g., a refrigeration/cooling system). Such a vapor compression system may be used for cooling (e.g., with its heat absorption heat exchanger integrated with a component being cooled).

In the installed condition, the heat exchanger is isolated from load paths between the engine and the fuselage by the compliance of the engine bay seal and engine seal including the example outer-diameter jog/convolution. This can contribute to enhanced heat exchanger life.

Engine removal may be by essentially the opposite process including axial extraction.

Component materials and manufacture techniques and assembly techniques may be otherwise conventional. In general, appropriate alloys are used and may be cast, machined, and/or additively manufactured. And assembly may be via bonding, welding or fasteners. Additionally, possible materials include composites.

The heat exchanger may be full annulus (continuous or segmented or) partial annulus. One group of partial annulus heat exchangers have a gap (e.g. up to about 120°) near the bottom to accommodate/pass other components. For example, the gap may accommodate components such as the gearbox 90 or electronics module 92 or connections therewith.

Such a gap may also be used to provide or accommodate asymmetric flows such as flows that turn from generally axial to circumferential when entering away from the gap and exiting at the gap.

Another group of partial annulus heat exchangers confine the heat exchanger to a zone near the bottom. For example, this may allow relatively easy/quick changeout. This may be particularly relevant for a fuel heat exchanger where there is greater possibility to, over time, become clogged with contaminants as new contaminants are continuously introduced with new fuel (as contrasted with closed loop systems). In some implementations, a fuselage hatch or the like may allow access to replace the heat exchanger even without extracting the engine. In others, the engine may be at least partially extracted but the bottom-mounted heat exchanger may be easy to remove without a crane or the like. In others, the partial extraction of the engine may be enough to lower the heat exchanger while access from above is still blocked by a tail, a pylon, or other structure.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline airframe and/or engine configuration, details of such baseline may influence details of particular implementations. Accordingly, other embodiments are within the scope of the following claims.

What is claimed is:

1. A craft comprising:
   a body including an engine bay; and
   an engine having an installed condition at least partially in the engine bay, wherein:
   the engine comprises a heat exchanger having an inlet manifold; and
   in the installed condition an air flowpath passes through the inlet manifold to the heat exchanger and exits the heat exchanger to the engine bay: wherein:
   the inlet manifold has an outer wall section having means for providing compliance comprising a radial jog in axial cross-sectional shape.

2. The craft of claim 1 wherein:
   in the installed condition, an engine bay seal seals with the inlet manifold.

3. The craft of claim 2 wherein:
in the installed condition, the air flowpath passes through the engine bay seal.

4. The craft of claim 2 wherein:
the air flowpath passes through apertures in the engine bay seal and in a portion of the inlet manifold contacting the engine bay seal.

5. The craft of claim 4 wherein:
the engine bay seal has first and second sections radially diverging from each other in an aft direction; and
the inlet manifold has a forwardly convex portion contacting the first and second sections in the installed condition.

6. The craft of claim 5 wherein:
the air flowpath passes through a circumferentially distributed plurality of said apertures in the engine bay seal first section and a circumferentially distributed plurality of said apertures in the inlet manifold.

7. The craft of claim 4 wherein:
the heat exchanger is isolated from load paths between the engine and a fuselage of the craft by the compliance of the engine bay seal and the inlet manifold.

8. The craft of claim 1 wherein:
the heat exchanger is a liquid to air heat exchanger.

9. The craft of claim 8 wherein:
the heat exchanger is along a recirculating liquid flowpath.

10. The craft of claim 8 wherein:
the heat exchanger is along a fuel flowpath.

11. The craft of claim 1 wherein:
the inlet manifold separates an inlet plenum for the heat exchanger from an outboard section of the engine bay along said air flowpath.

12. The craft of claim 1 wherein:
the inlet manifold has a rearwardly open forward channel section having an inboard portion extending forward and outward from a main portion of an engine case, the channel section then turning back at a forward rim to form the outer wall section; and
the radial jog can axially compress and extend allowing hinging flex of the inboard portion.

13. A method for assembling the craft of claim 1, the method comprising:
inserting the engine to the engine bay with the heat exchanger pre-installed on the engine.

14. The method of claim 13 wherein:
the inserting causes the inlet manifold to contact an engine bay seal.

15. The method of claim 14 wherein:
the craft is an aircraft.

16. The method of claim 14 wherein:
the inserting inserts the entire inlet manifold.

17. A method for using the craft of claim 1, the method comprising:
passing an inlet airflow to the engine;
passing a portion of the inlet airflow through one or more compressor sections to a combustor; and
passing another portion of the inlet airflow along the air flowpath to the inlet manifold and through the heat exchanger to exit the heat exchanger into the engine bay.

18. The method of claim 17 further comprising:
extracting the engine from the craft while leaving the heat exchanger and inlet manifold on the engine.

19. The method of claim 18 wherein:
the extracting the engine from the craft while leaving the heat exchanger and the inlet manifold on the engine leaves the entire inlet manifold on the engine.

* * * * *